United States Patent
Colon-Bonet et al.

(10) Patent No.: US 6,742,011 B1
(45) Date of Patent: May 25, 2004

(54) APPARATUS AND METHOD FOR INCREASING PERFORMANCE OF MULTIPLIERS UTILIZING REGULAR SUMMATION CIRCUITRY

(75) Inventors: Glenn T Colon-Bonet, Ft Collins, CO (US); Stephen L Bass, Ft Collins, CO (US); Thomas J. Sullivan, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/504,984

(22) Filed: Feb. 15, 2000

(51) Int. Cl.[7] .............................. G06F 7/52; G06F 7/50
(52) U.S. Cl. ...................... 708/625; 708/620; 708/708
(58) Field of Search ................................ 708/632, 531, 708/625, 700–714, 620

(56) References Cited

U.S. PATENT DOCUMENTS

| | | | | |
|---|---|---|---|---|
| 4,041,292 A | * | 8/1977 | Kindell ........................ 708/632 |
| 4,523,210 A | * | 6/1985 | Kregness ..................... 708/531 |
| 4,556,948 A | * | 12/1985 | Mercy ......................... 708/625 |
| 4,752,905 A | * | 6/1988 | Nakagawa et al. ......... 708/625 |
| 4,901,270 A | * | 2/1990 | Galbi et al. ................. 708/708 |
| 5,426,598 A | * | 6/1995 | Hagihara .................... 708/627 |
| 5,504,915 A | * | 4/1996 | Rarick ........................ 708/708 |
| 5,677,863 A | | 10/1997 | Naffziger .................... 708/698 |
| 5,706,323 A | | 1/1998 | Miller |
| 5,719,802 A | * | 2/1998 | Purcell et al. .............. 708/518 |
| 5,892,698 A | | 4/1999 | Naffziger .................... 708/507 |
| 6,598,064 B1 | * | 7/2003 | Green ......................... 708/620 |
| 6,615,229 B1 | * | 9/2003 | Vijayrao et al. ............ 708/629 |

OTHER PUBLICATIONS

Reza Hashemian, Multiplication Using Fast Multi–operand Adder, 1992, IEEE, p. 303–306.*

Heikes, et al., "SP 22.1: A Dual Point Coprocessor with an FMAC Architecture," ISSCC96/Session 22/Microprocessor Functional Blocks & Circuits/ Paper SP 22.1, Feb. 10, 1996 IEEE International Solid–State Circuits Conference, pp. 354 and 355.

* cited by examiner

Primary Examiner—Kakali Chaki
Assistant Examiner—Chat C Do

(57) ABSTRACT

The present invention generally relates to an apparatus and method for efficiently summing the partial product bits produced by a multiplier. Briefly described, in architecture, the apparatus includes a first array of odd/even summation circuitry, a second array of odd/even summation circuitry, and a linear array of adders. The apparatus is configured to add a row of partial product bits produced by a multiplier in multiplying a first operand with a second operand. The first array of odd/even summation circuitry produces a first summation of a portion of the partial product bits. The second array of odd/even circuitry produces a second summation of the other partial product bits. The linear array of adders then adds the first summation and the second summation to produce a carry save representation of a product bit (i.e., a bit of the product produced by multiplying the first operand by the second operand).

19 Claims, 11 Drawing Sheets

FIG. 1A
PRIOR ART

RADIX 4 BOOTH RECODING

| MULTIPLIER BITS | | | SELECTION |
|---|---|---|---|
| Y(I+1) | Y(I) | Y(I-1) | |
| 0 | 0 | 0 | +0 |
| 0 | 0 | 1 | +1X |
| 0 | 1 | 0 | +1X |
| 0 | 1 | 1 | +2X |
| 1 | 0 | 0 | -2X |
| 1 | 0 | 1 | -1X |
| 1 | 1 | 0 | -1X |
| 1 | 1 | 1 | -0 |

FIG. 1B
PRIOR ART

RADIX 8 BOOTH RECODING

| MULTIPLIER BITS | | | | SELECTION |
|---|---|---|---|---|
| Y(I+2) | Y(I+1) | Y(I) | Y(I-1) | |
| 0 | 0 | 0 | 0 | +0 |
| 0 | 0 | 0 | 1 | +1X |
| 0 | 0 | 1 | 0 | +1X |
| 0 | 0 | 1 | 1 | +2X |
| 0 | 1 | 0 | 0 | +2X |
| 0 | 1 | 0 | 1 | +3X |
| 0 | 1 | 1 | 0 | +3X |
| 0 | 1 | 1 | 1 | +4X |
| 1 | 0 | 0 | 0 | -4X |
| 1 | 0 | 0 | 1 | -3X |
| 1 | 0 | 1 | 0 | -3X |
| 1 | 0 | 1 | 1 | -2X |
| 1 | 1 | 0 | 0 | -2X |
| 1 | 1 | 0 | 1 | -1X |
| 1 | 1 | 1 | 0 | -1X |
| 1 | 1 | 1 | 1 | -0 |

FIG. 1C
PRIOR ART

LEVELS OF CSAS' IN A WALLACE TREE FOR K PARTIAL PRODUCTS

| NUMBER OPERANDS | # CSA LEVELS |
|---|---|
| 3 | 1 |
| 4 | 2 |
| $5 \leq K \leq 6$ | 3 |
| $7 \leq K \leq 9$ | 4 |
| $10 < K < 13$ | 5 |
| $14 < K < 19$ | 6 |
| $20 < K < 28$ | 7 |
| $29 < K < 42$ | 8 |
| $43 < K < 63$ | 9 |

FIG. 1D
PRIOR ART

```
                        ╭─ 5
          1001110010110111 = 63,669 DECIMAL
          1111100010110101 = 40,119
          ⊔⊔⊔⊔⊔⊔⊔⊔
Booth Recoded Value  +1  0  0 -2 +1 -1 -1 +1 +1
```

```
                        ╭─ 6
          01001110010110111 = 63,669
          01111100010110101 = 40,119
          ⊔⊔ ⊔⊔ ⊔⊔ ⊔⊔
Booth Recoded Value  +2   0  -4  +3  -1  -3
```

```
                                    1001110010110111 = 63,669 DECIMAL
                                    1111100010110101 = 40,119
                                              ↖ 5A 1000100111001010110111
                                    1101011000101101110111
                                    1010110001101101001000  +1
                                    1010100111001011011011  +1
                        LOWER EVEN/  1001100011101010010001
                        ODD PARTIAL  1000000000000000000000  +1
                        PRODUCT      1000000000000000000000
                        SUMMATION    1100111001011110110111
                        ─────────────────────────────────────
                        UPPER EVEN/
                        ODD PARTIAL
                        PRODUCT
                        SUMMATION    0100110000100000000000101010101100011 = 2,554,336,611
```

APPARATUS AND METHOD FOR INCREASING PERFORMANCE OF MULTIPLIERS UTILIZING REGULAR SUMMATION CIRCUITRY

BACKGROUND OF THE INVENTION

1. Technical Field

The present invention generally relates to a multiplication apparatus and method for increasing the efficiency of multipliers, and more particularly, to an apparatus and method for increasing the performance of a low radix multiplier such that high radix performance can be achieved without a significant increase in wiring circuitry.

2. Description Of Related Art

Currently, the speed of many arithmetic operations in present processor implementations is increased by utilizing a floating-point processor. A floating-point processor usually includes carry save adders to increase the performance of multiplication operations.

Generally, there are two popular stages of radix multiplication for microprocessors. High radix multiplication (radix 8 or greater) has the advantage of requiring fewer partial products to be generated and summed, as compared with low radix multiplication (radix 4 or lesser). However, high radix multiplication requires that complex multiples of the X operand to be generated. An example of this is illustrated in FIG. 1B with regard to the 3X and -3X operands required for radix 8 multiplication applications.

Figures 1D, 1E:
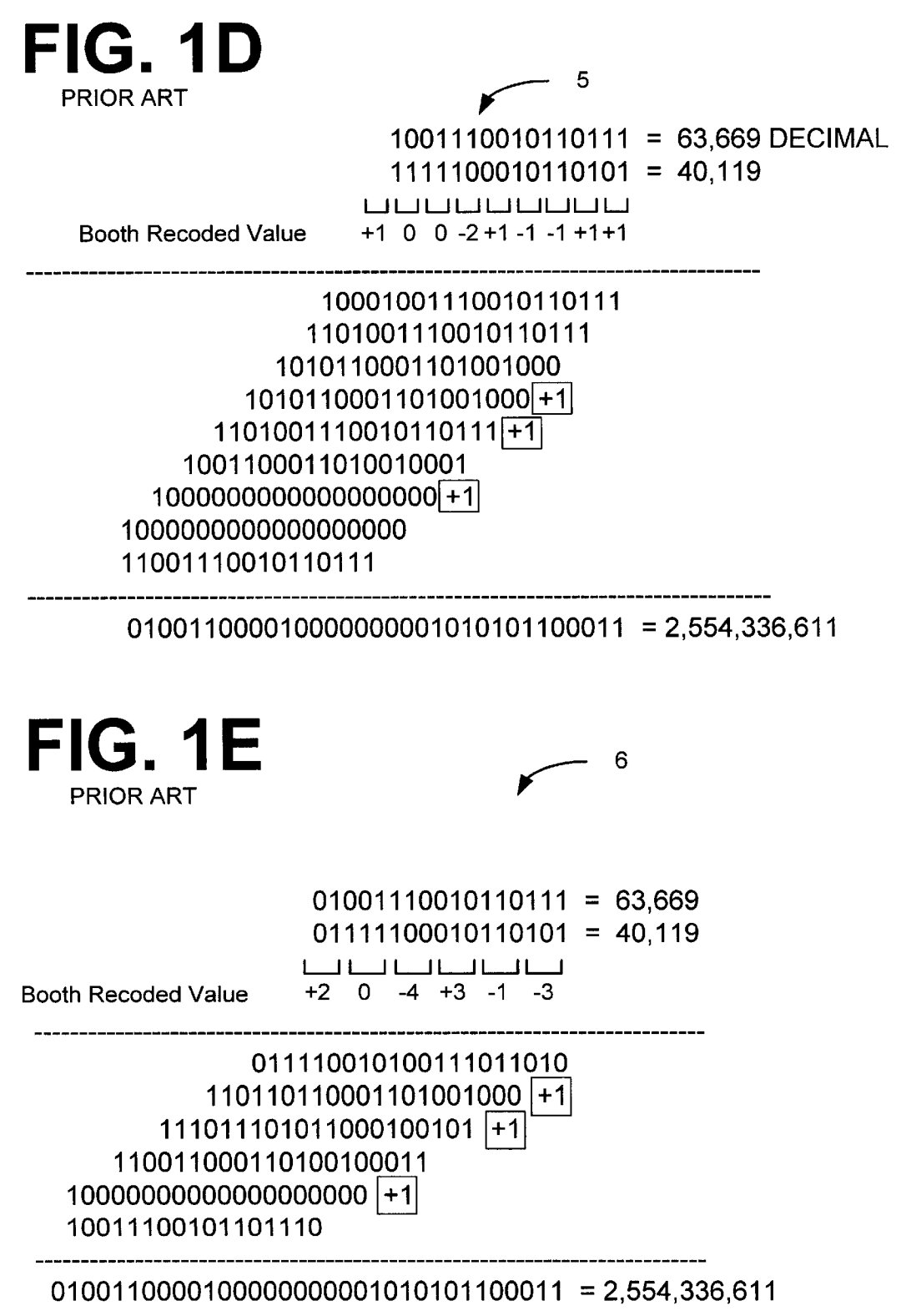

FIG. 1A depicts the radix 4 multiplication table, the 3 multiplier bits, and X operand multiples. As can be seen for radix 4 multiplication, only the simple multiples of zero, 1X, and 2X are required for the operand. As it is known in the art, a multiple of a number can be easily generated for the zero, one, and two multiples. A zero multiple requires only that the value be reset, zeroed out, or cleared out. A -1X multiple requires that the complement of the operand be obtained. A 2X multiple of a number is easily generated for the number by performing a left shift by one position on the number. A -2X multiple of a number is obtained by acquiring the complement of the 2X multiple times.

FIG. 1B depicts the radix 8 multiplication table, the 4 multiplier bits, and X operand multiples. As can be seen by referring to FIG. 1B, radix 8 multiplication requires the multiples of the zero, 1X, 2X, 3X, and 4X. As noted above, the zero, 1X, and 2X multiples are fairly straightforward and easy to compute. However, the 3X and -3X multiples required for radix 8 multiplication are quite complex and require special circuitry, such as carry look ahead adders, to compute. The 3X and -3X operand multiples are computed by using a carry propagation adder that adds the 1X and 2X multiples to generate the 3X multiples and by acquiring the complement of the 3X multiple. The 4X and -4X multiples are fairly straightforward and easy to compute. The 4X and -4X multiples are computed by performing a left shift by two positions for the binary number and by acquiring the complement of the 4X multiple.

As stated above, a major problem with radix 8 multiplication is the generation of the 3X and -3X operand multiples.

While the simplicity of radix 4 multiplication is often preferred to radix 8 multiplication there are some advantages of radix 8 multiplication. First, radix 8 multiplication generates fewer partial products that must be dealt with.

In this regard, radix 4 multiplication often requires many more carry save adders as compared to radix 8. For example, for a 64-bit array, radix 4 multiplication usually requires 33 rows of carry save adders to compute the product. For a 64-bit array, radix 8 multiplication requires only 22 rows of carry save adders to compute the product. This is computed utilizing the formula "(number of bits manipulated+number of bits of the multiplier)/number of bits of the multiplier". For radix 4 multiplication the formula equals [(64+2)/2]=33 rows, and for the radix 8 application the formula equals [(64+3)/3]=22 rows. This reduction of 11 rows for computing the multiplication product reduces the delay of the multiplier by the speed of at least one gate delay per row.

Illustrated in FIG. 1C is a table for illustrating the levels of carry save adders required for K operands using the optimal Wallace tree architecture in the prior art. This table was obtained empirically by drawing tree structures for various word sizes. The Wallace tree summation network utilizes the fewest number of carry save adder delays.

FIG. 1D depicts a diagram of an example of a Booth-2 (radix 4) multiply with partial products for multiplying two 16 bit numbers. As can be seen by referring to FIG. 1D, there are nine rows of partial products to be added together to compute a final product for the two operands. To this end, the partial products form columns of partial product bits, and as known in the art, each of the bits in one column should be added together to produce one of the bits of the product. The least significant bit of the sum of all of the bits in the column represents the product bit for the bit position corresponding to the column. The other bits of the sum are shifted to the adjacent column for inclusion into the summation of the adjacent column. By summing each of the columns in this way, the product can be determined. Note that the additional 1's ("+1") on the right side of the partial product depicted by FIG. 1D are needed to complete the 2's complement for cases when a negative booth multiple is selected.

FIG. 1E depicts a diagram of an example of a Booth-3 (radix 8) multiply with partial products. As can be seen in this example, there are only six rows of partial products to be added together to compute a final product for the two 16 bit operands. This is accomplished because the radix 8 multiplier generates fewer partial products by generating 3X and 4X multiples. As can be seen in FIG. 1E, the partial products generated by the radix 8 multiplier contain an offset of three extra bits per partial product as compared to the partial products generated by the radix 4 multiplier (FIG. 1D), thereby requiring a larger shift per partial product row. This larger shift per partial product row leads to increased wiring complexity.

FIG. 1F depicts a block diagram of a prior example of a linear summation array multiplier 7 for partial products. As can be seen, each of the carry save adders (CSA) receives a partial product term (P). Each of the carry save adders also receives a sum (S) and carry (C) term from two previous carry save adders. This is a simple architecture to implement and has a regular structure. The linear summation array multiplier 7 may be utilized to compute a final product for the two operands of FIG. 1D. The nine rows of partial products (FIG. 1D) are added together one bit at a time. Although this structure is one of the simplest and most regular of all known summation structures, it also exhibits one of the highest delays making it impractical for adding a large number of partial products.

FIG. 1G depicts a block diagram of a prior example of an odd/even summation array 8 for partial products in a multiplier. As can be seen by referring to FIG. 1G, each of the carry save adders (CSA) receives a partial product term.

Each of the carry save adders also receives a sum and carry term from two previous carry save adders. However, in this odd/even summation implementation, the sum and carry terms from previous carry save adders skip every other row. While this architecture is more complex to implement, it has the advantage of having approximately one-half the number of adder delays as the linear summation array multiplier 7 (FIG. 1F).

FIGS. 2A and 2B illustrate an example of conventional linear summation circuitry 30 that may be utilized to add the partial product bits in a column of partial products to produce a bit of the product of two operands. In this regard, the circuitry 30 depicted in FIGS. 2A and 2B may be utilized to add a column of partial product bits for up to eighteen rows of partial products. Since the circuitry 30 adds a bit from each row of the radix 4 partial products, the circuitry 30 depicted by FIGS. 2A and 2B may add up to 18 bits of information.

The linear summation circuitry 30 utilizes a linear array of 16 carry save adders 31–38 and 41–48. A linear array of adders is an array of adders in which each of the adders transmits each of its outputs to the same next adder. As shown by FIGS. 2A and 2B, the configuration of the linear summation circuitry 30 has a regular and efficient layout. This configuration provides for light loading and simple interconnections for the carry save adder cells. However, the linear summation has a problem in that it produces a large number of carry save adder delays (in this case 16 delays) in the critical path.

FIG. 3 depicts a block diagram of conventional odd/even summation circuitry 50 that may be utilized to add the partial product bits in a column of partial products to produce a bit of the product of two operands. In this regard, the circuitry 50 depicted in FIG. 3 may be utilized to add a column of partial product bits for up to eighteen rows of partial products. Since the circuitry 50 adds a bit from each row of the partial products, the circuitry 50 depicted by FIG. 3 may add up to 18 bits of information.

As can be seen by referring to FIG. 3, the odd/even summation circuitry 50 utilizes a first linear array of carry save adders 51, 53, 55, 57, 61, 63, and 65 and a second linear array of carry save adders 52, 54, 56, 58, 62, 64, and 66. Approximately half of the partial product bits 1, 2, 3, 5, 7, 9, 11, 13, 15, and 17 are added by the first linear array of carry save adders, and the remaining bits 4, 5, 6, 8, 10, 12, 14, 16, and 18 are added by the second linear array of interconnected carry save adders. The results produced by the first and second linear arrays of carry save adders are then added via carry save adders 67 and 68 to produce the appropriate results for the circuitry 50.

In this example of eighteen partial product bits depicted by FIG. 3, the configuration of the odd/even summation circuitry 50 causes only nine carry save adder delays. When the odd/even summation circuitry 50 is utilized to the fullest extent, the layout produces seven fewer carry save adder delays, as compared with the linear summation circuitry 30 (FIGS. 2A and 2B). Utilizing the odd/even summation circuitry 50 usually requires more complex wiring than a simple linear array with increased loading on the carry save adders, but the odd/even summation circuitry 50 is substantially faster than linear summation circuitry 30 because the odd/even summation circuitry 50 performs parallel summations. This parallelism achieves much of the speed benefits but requires somewhat more complex wiring, as mentioned above.

FIG. 4 depicts a block diagram of a prior example of circuitry 70 utilizing a full Wallace tree summation configuration that may be utilized to add the partial product bits in a column of up to 18 rows of partial products. The full Wallace tree summation circuitry 70 shown by FIG. 4 utilizes 16 carry save adders 71–78 and 81–88. In this example for 18 bits, the configuration of the full Wallace tree summation circuitry 70 causes only six carry save adder delays, as shown by FIG. 4. When a full Wallace tree summation configuration is utilized to the fullest extent, the layout produces ten fewer carry save adder delays as compared with linear summation circuitry 130 (FIGS. 2A and 2B) and three fewer carry save adder delays as compared with the odd/even summation circuitry 50 (FIG. 3). However, utilizing a full Wallace tree summation configuration requires the most irregular and complex wiring of the three summation configuration types.

For illustrative purposes, assume that the circuitry 30 and 50 is implemented in a radix 4 multiplier. If a radix 8 multiplier is used instead, then the number of carry save adders can be reduced since the number of partial products is reduced. In this regard, the circuitry 50 of FIG. 3 can be reduced to the circuitry 110 of FIG. 5 when a radix 8 multiplier is used instead of a radix 4 multiplier. Therefore, the odd/even summation circuitry 110 may be implemented with only 10 carry save adders (111–118, 121 and 122), resulting in only six carry save adder delays, as shown by FIG. 5. When the odd/even summation circuitry 110 is utilized to the fullest extent, the circuitry 110 produces the same number of carry save adder delays as the full Wallace tree summation circuitry 70 (FIG. 4), which uses very irregular and complex wired carry save adders. However, utilizing radix 8 partial products requires the much more complicated implementation of radix 8 partial product generators and the generation of the 3X operand multiple.

Thus, a heretofore unaddressed need exists in the industry for summation circuitry having a simple and regular pattern that is capable of achieving near the performance of Wallace tree summation circuitry without requiring the use of high radix multipliers.

SUMMARY OF THE INVENTION

The present invention provides an apparatus and method for utilizing regular summation circuitry to optimally sum the partial products produced by a multiplier in terms of speed and wiring complexity.

Briefly described, in architecture, the apparatus includes a first array of odd/even summation circuitry, a second array of odd/even summation circuitry, and a linear array of adders. The apparatus is configured to add a row of partial product bits produced by a multiplier in multiplying a first operand with a second operand. The first array of odd/even summation circuitry produces a first summation of a portion of the partial product bits. The second array of odd/even circuitry produces a second summation of the other partial product bits. The linear array of adders then adds the first summation and the second summation to produce a carry save representation of a product bit (i.e., a bit of the product produced by multiplying the first operand by the second operand).

In accordance with another feature of the present invention, the adders within an array of odd/even summation circuitry can be configured to receive inputs from adders outside of the array to further increase performance. For example, the first array of odd/even summation circuitry described above may include a first linear array of adders and a second linear array of adders. The first linear array of adders may include a first adder and a second adder. The first adder receives output from the second adder and from another adder outside of the first linear array of adders. This other adder receives and adds a plurality of partial product bits from the portion of partial product bits set forth hereinabove. As a result, a larger number of partial products can be added via the first linear array of adders.

The present invention can also be viewed as providing a method for summing partial product bits in a multiplier, the multiplier for producing a plurality of partial products based on a first operand and a second operand multiplied together by the multiplier to produce a product. In this regard, the method can be broadly summarized by the following steps: adding, via an array of odd/even summation circuitry, a first plurality of partial product bits, each of the first plurality of partial product bits from a different one of a portion of the partial products to produce a first plurality of sum and carry bits; adding, via another array of odd/even summation circuitry, a second plurality of partial product bits, each of the second plurality of partial product bits from a different one of the remaining partial products to produce a second plurality of sum and carry bits; adding the first and second pluralities of sum and carry bits; and producing a third plurality of sum and carry bits via the adding the first and second pluralities of sum and carry bits step, the third plurality of bits forming a carry save representation of a product bit of the product.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1A is a multiplication table for radix 4 including three multiplier bits and the operand multiplier.

FIG. 1B is a multiplication table for radix 8 including four multiplier bits and the operand multiplier.

FIG. 1C is a table for illustrating the number of levels of carry save adders required for K operands using the optimal Wallace tree architecture.

FIG. 1D is a diagram illustrating an example multiplication using Booth-2 (radix 4) with partial products.

FIG. 1E is a diagram of an example multiplication using a Booth-3 (radix 8) with partial products.

FIG. 6 is a diagram illustrating an example multiplication using Booth-2 (radix 4) with partial products according to the techniques of the present invention.

DETAILED DESCRIPTION OF THE PREFERRED EMBODIMENT

Figure 1F:
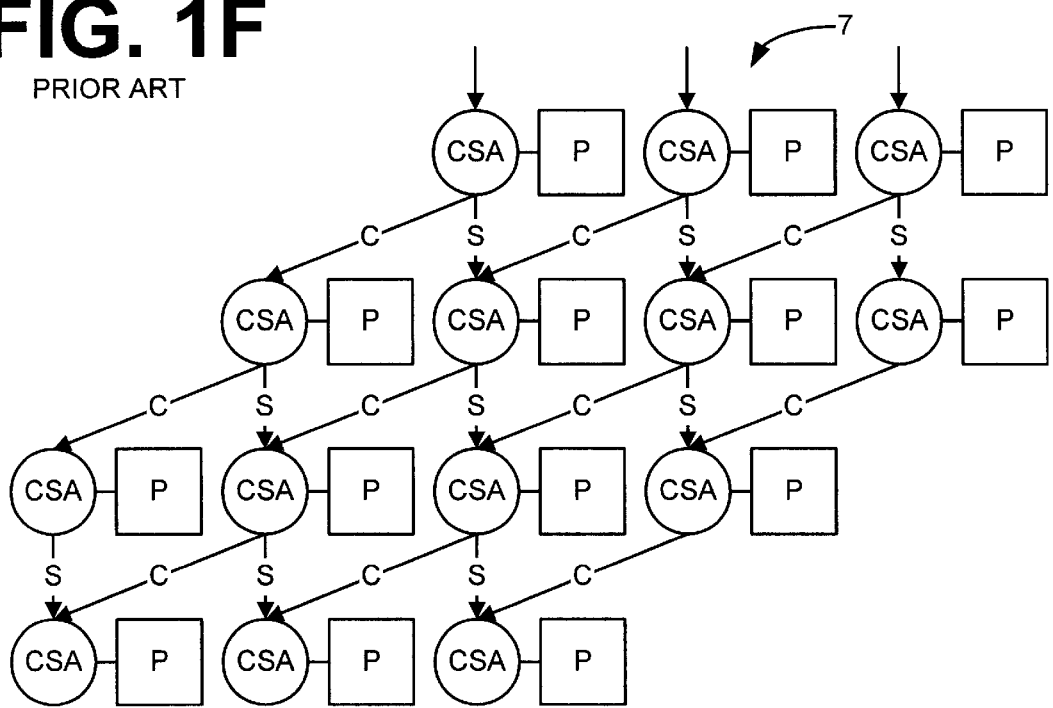
FIG. 1F is a block diagram of an example of a linear summation array multiplier.
Figure 1G:
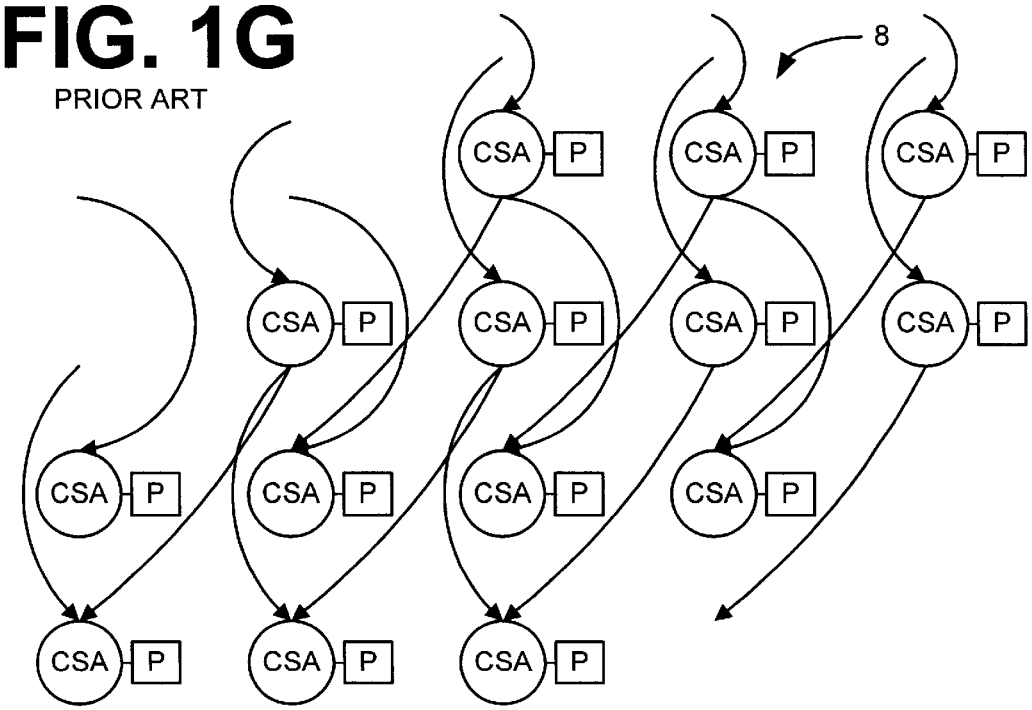
FIG. 1G is a block diagram of an example of an odd/even summation array multiplier.
Figure 2A:
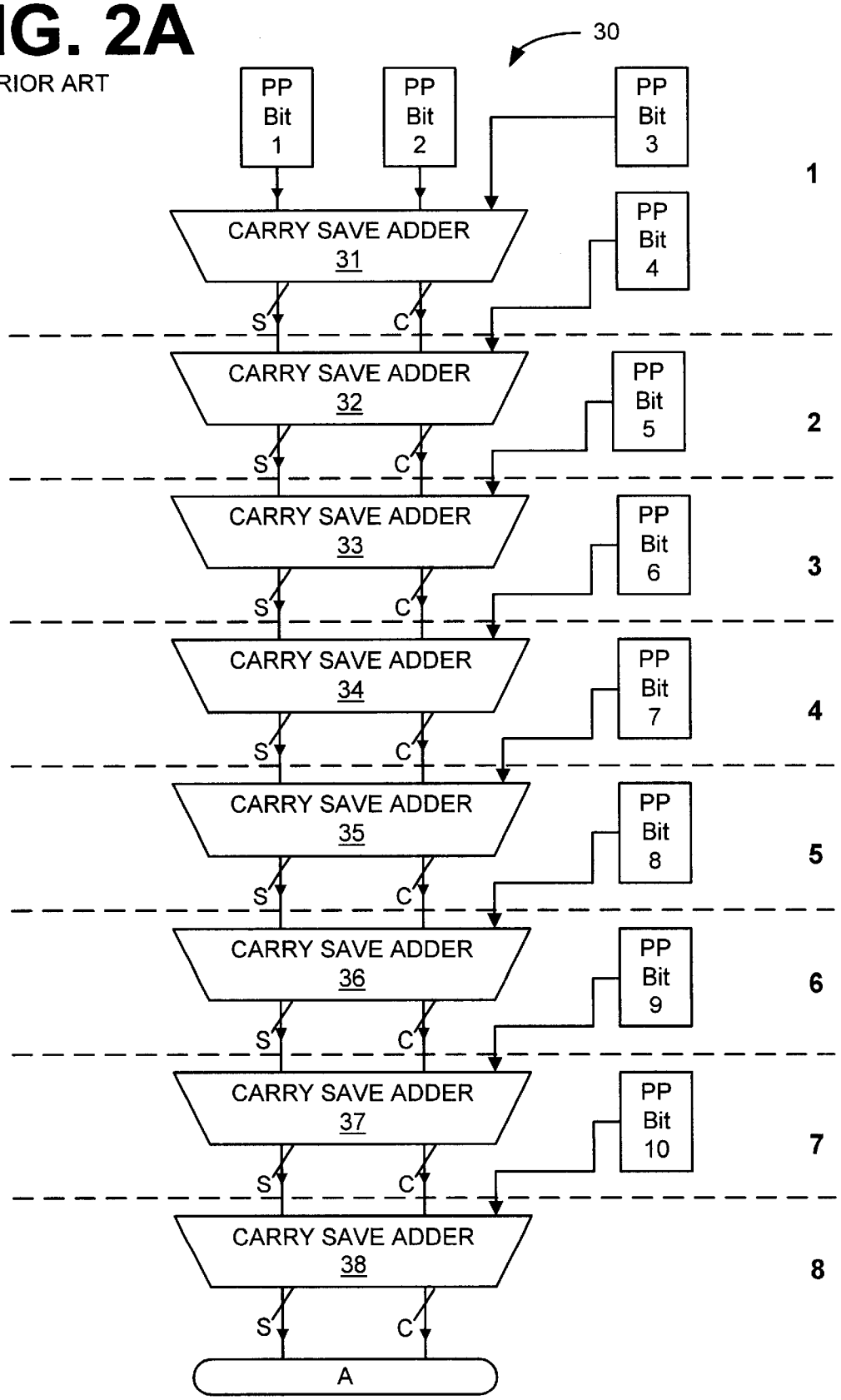
FIGS. 2A and 2B are block diagrams of conventional linear summation circuitry for adding a column of partial products.
Figure 2B:
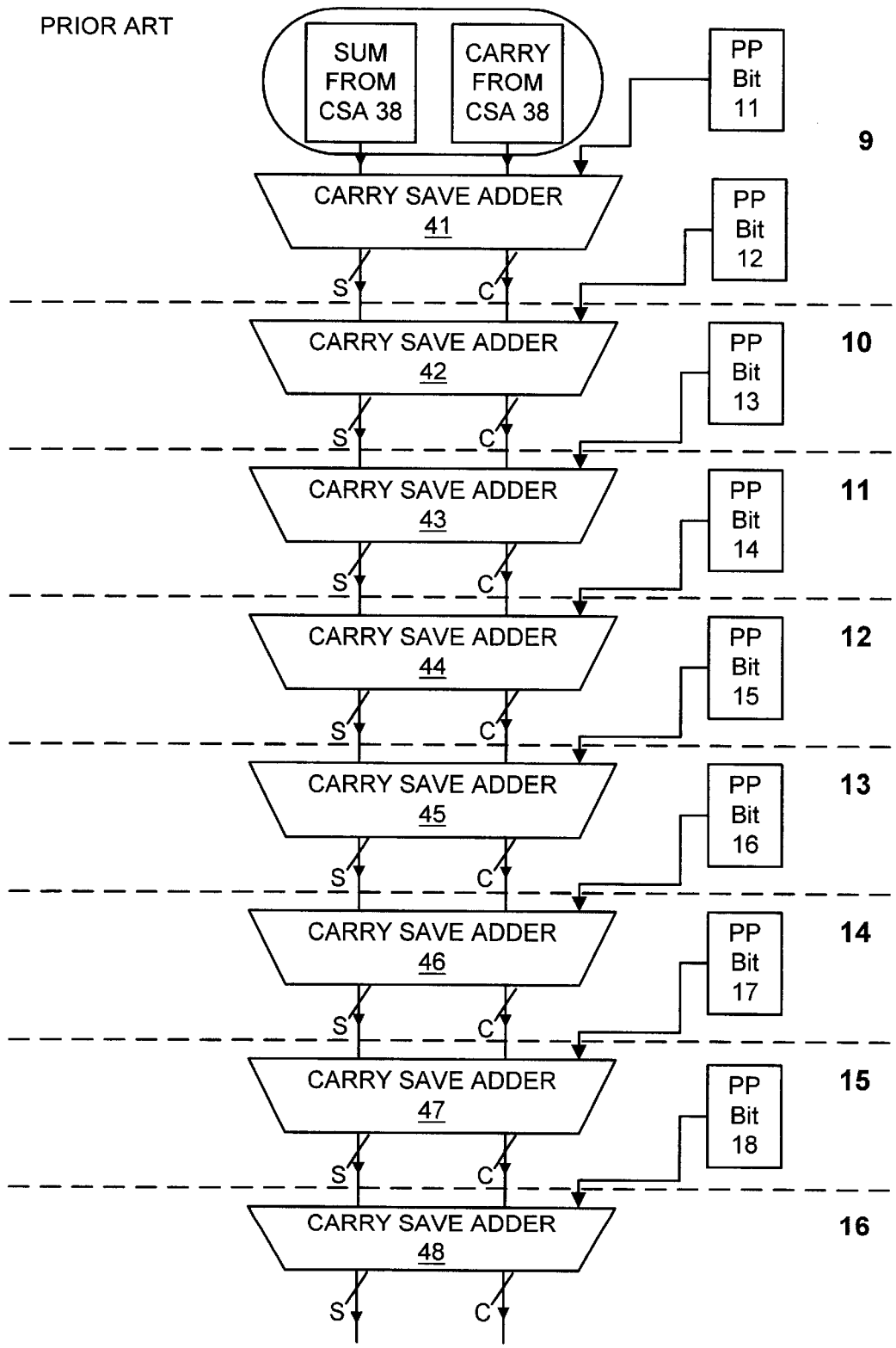

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the scope of the invention as defined by the appended claims.

Figure 3:
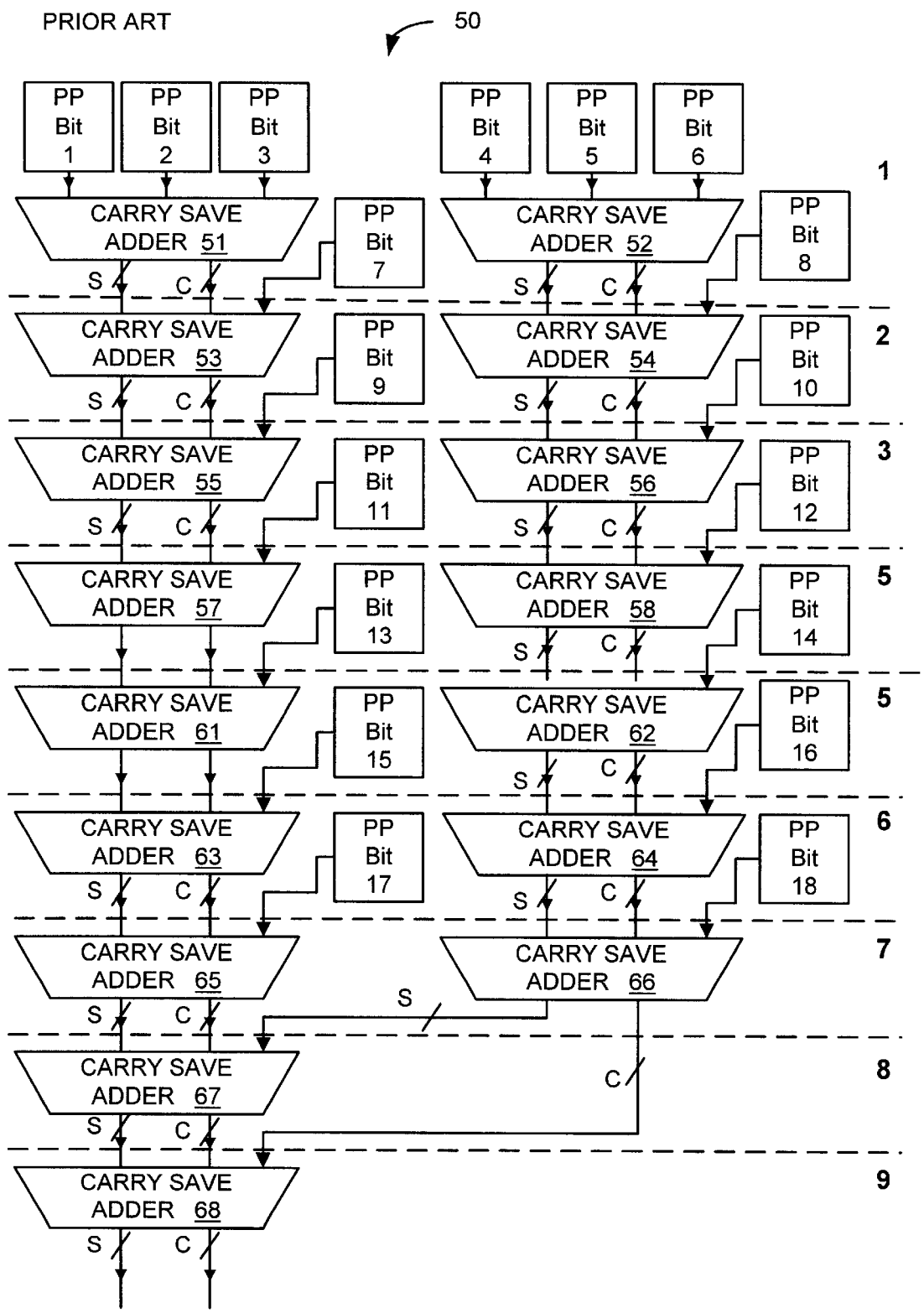
FIG. 3 is a block diagram of conventional odd/even summation circuitry for adding a column of eighteen partial products produced by a radix 4 multiplier when multiplying two operands.
Figure 4:
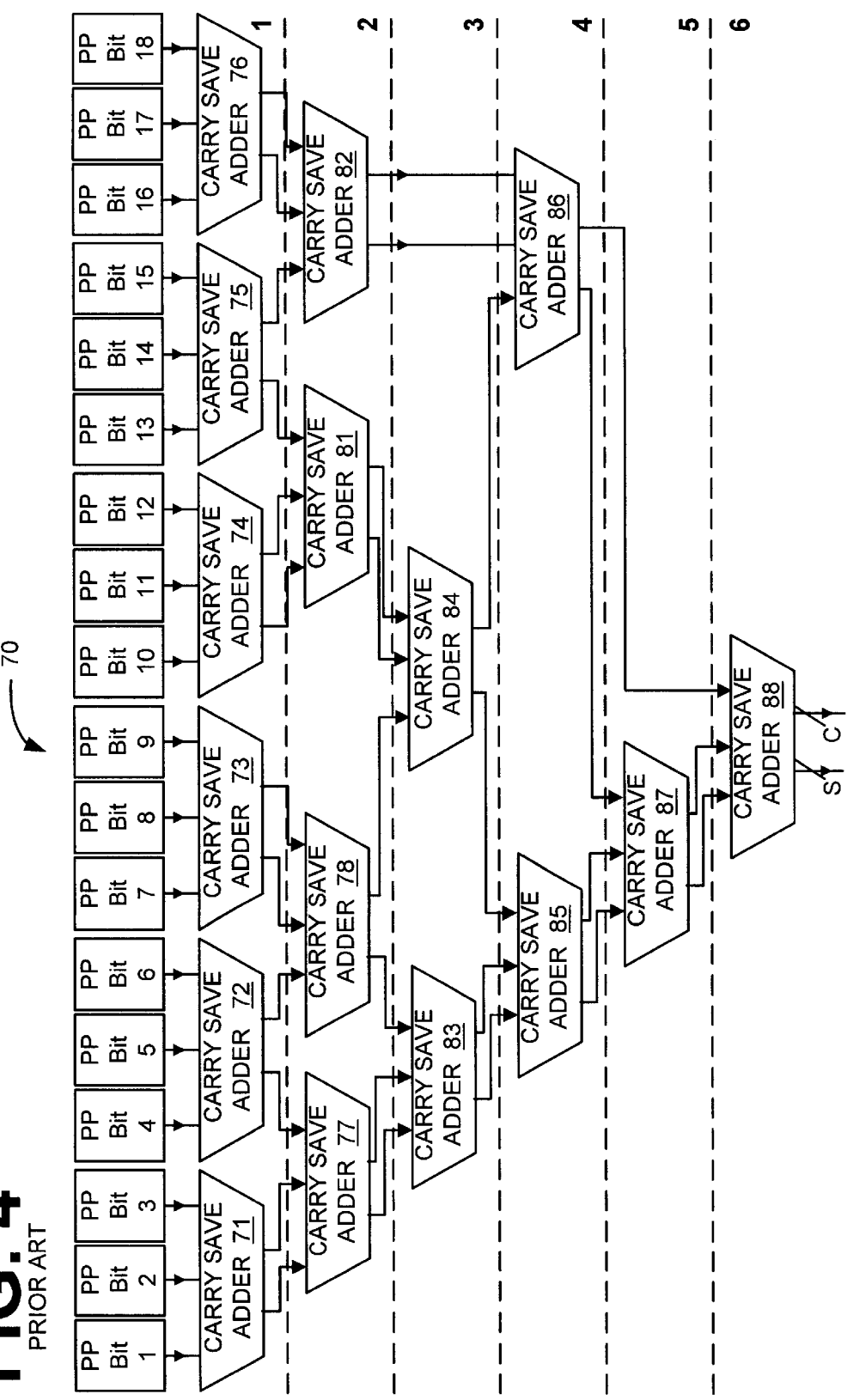
FIG. 4 is a block diagram of conventional full Wallace tree summation circuitry for adding a column of partial products produced by a radix 4 multiplier when multiplying the foregoing two operands.

The present invention utilizes the odd/even summation techniques employed by the circuitry 50 depicted in FIG. 3 to achieve optimal performance in terms of speed and wiring complexity. In this regard, the rows of partial products produced from two operands are grouped into two groups having a substantially equal number of rows in each group. For example, in FIG. 6, the nine rows of partial products are grouped into a first group (a lower odd/even partial product summation group) having five rows of partial products and are grouped into a second group (an upper odd/even partial product summation group) having four rows of partial products. Then, to add a column of the partial products (i.e., to add together each of the partial product bits in the partial products corresponding to the same bit position in the product), odd/even summation techniques, similar to the techniques employed by the circuitry 50 of FIG. 3, are utilized to add the bits in the column of the lower odd/even partial product summation group and separately to add the bits in the column of the upper odd/even partial product summation group. Then, the results produced by summing the two groups are added together to produce the sum of all of the bits in the column of partial products being added.

As a result, the summation techniques of the present invention achieve near radix 8 performance without a significant increase in wiring complexity relative to the carry save adders employed via the odd/even circuitry 50 depicted by FIG. 3.

Figure 7:
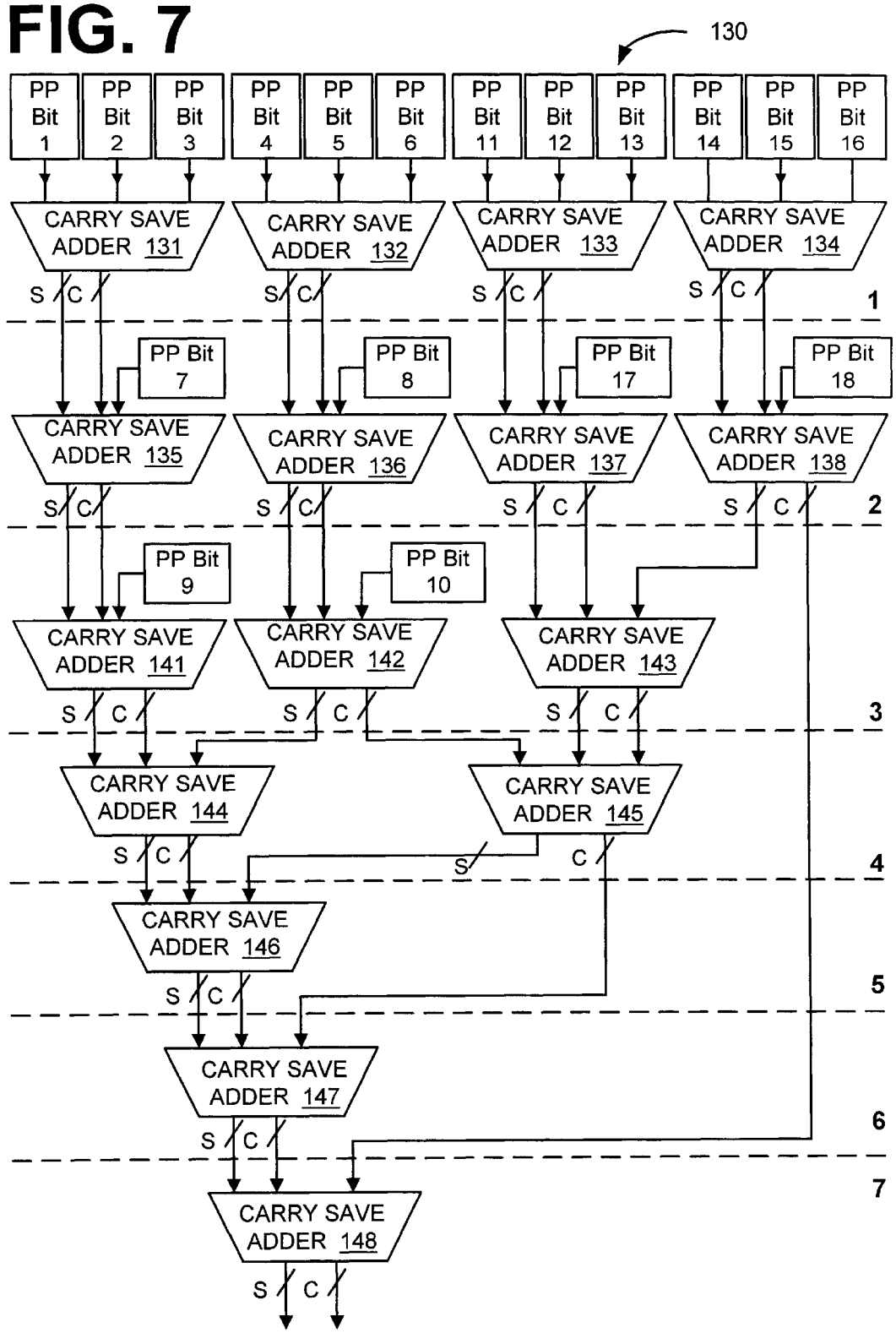
FIG. 7 is block diagram of summation circuitry for adding a column of partial products that have been separated into multiple groups in accordance with the present invention.

FIG. 7 depicts exemplary circuitry 130 that may be used to implement the present invention. The circuitry 130 depicted by FIG. 7 may be used to add a column of bits in up to eighteen rows of partial products. Therefore, the circuitry receives eighteen partial product bits as input. However, it should be apparent to one skilled in the art upon reading this disclosure that the configuration of circuitry 130 may be modified to increase or decrease the number of inputs without departing from the principles of the present invention.

The circuitry 130 shown by FIG. 7, which processes eighteen bits of input, is segregated into timing sections that include logic operations occurring in approximately the same timing period (e.g., during the same clock cycle). As can be seen in FIG. 7, the circuitry 130 is segregated into seven timing periods. In those cases where a plurality of logic is within the same timing period, the logic operations are performed substantially concurrently.

As previously noted, the circuitry 130, shown in FIG. 7, receives eighteen partial product bits as input. In timing section 1, the partial product bits 1–6 and 11–16 are input into four carry save adders 131–134. Each of these four carry save adders 131–134 compute the sum and carry outputs for three partial product bits.

In timing section 2, the sum and carry outputs of the four carry save adders 131–134 are input into four carry save adders 135–138, respectively. Also input into the four carry save adders 135–138 are four partial product bits 7, 8, 17 and 18, respectively.

As shown in FIG. 7, partial product bit 7 is added with the summation of partial product bits 1–3 and partial product bit 8 is added with the summation of partial product bits 4–6. Also shown are partial product bits 17 and 18, which are respectively added by carry save adders 137 and 138. Each of the these four carry save adders 135–138 computes the sum and carry outputs of one partial product bit and the sum and carry outputs of three partial product bits from the previous carry save adder.

In timing section 3, the sum and carry outputs of carry save adders 135 and 136 are input into carry save adders 141 and 142, respectively. Also input into carry save adders 141 and 142 are partial product bits 9 and 10, respectively. Again, the odd/even summation configuration of partial product bits is utilized. Also in timing section 3, the sum and carry output of carry save adder 137 and the sum output of carry save adder 138 are input into carry save adder 143. Carry save adder 143 is the first carry save adder in the circuitry 130 to compute sum and carry outputs exclusively from the sum and carry inputs of previous carry save adders.

In timing section 4, the sum and carry outputs of carry save adder 141 are input into carry save adder 144. Also input into carry save adder 144, is the sum output of carry save adder 142. The carry output from carry save adder 142 and the sum and carry outputs of carry save adder 143 are input into carry save adder 145. In timing section 5, the sum and carry outputs of carry save adder 144 are input into carry save adder 146. Also input into carry save adder 146 is the sum output from carry save adder 145.

In timing section 6, the sum and carry outputs of carry save adder 146 are input into carry save adder 147. The carry output from carry save adder 145 is also input into carry save adder 147.

In timing section 7, the sum and carry outputs of carry save adder 147 are input into carry save adder 148. Also input into carry save adder 148 is the carry output from the carry save adder 138 in timing section 2. The sum and carry outputs of carry save adder 148 are used as the overall sum and carry output of the circuitry 130.

Figure 5:
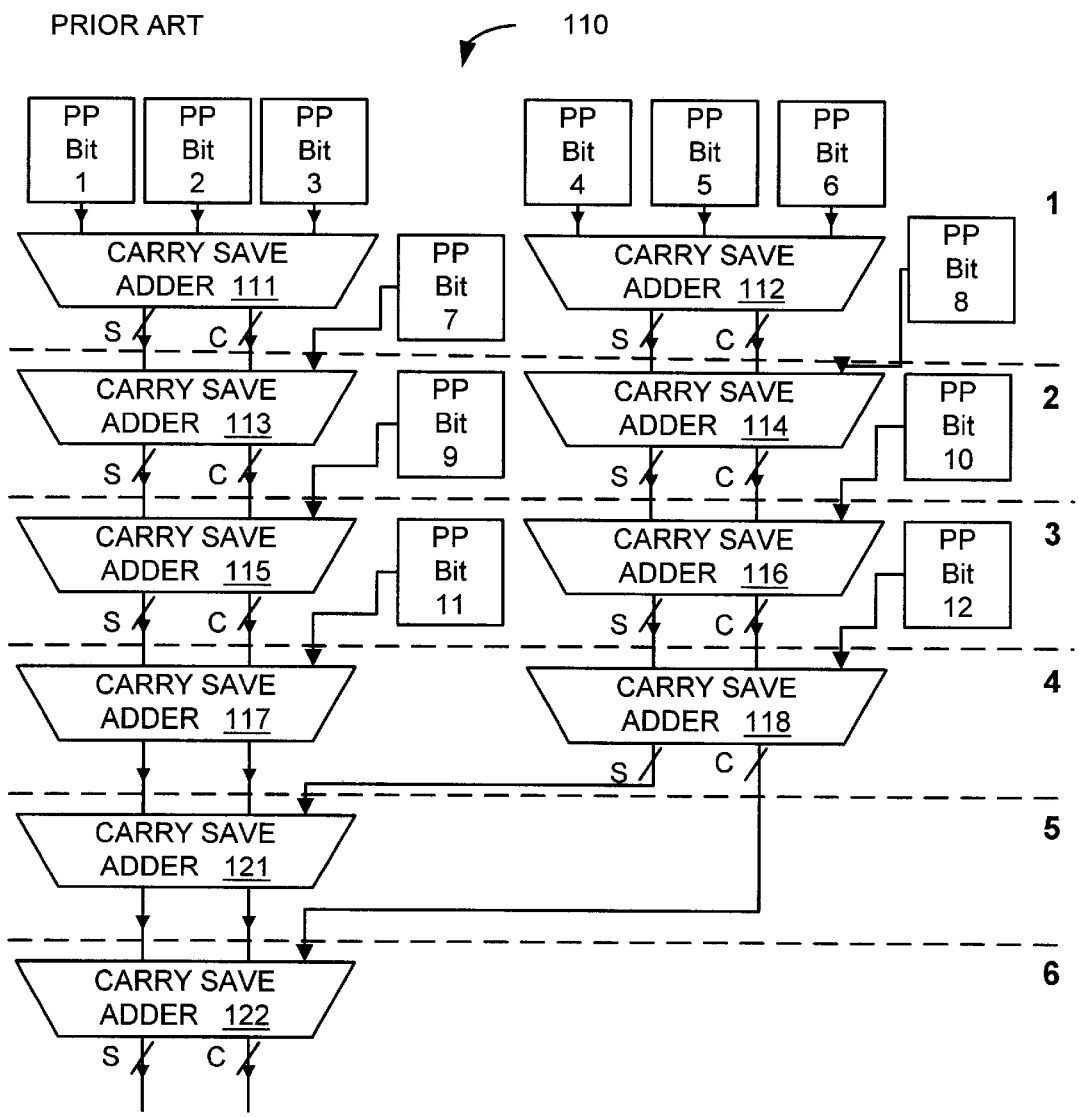
FIG. 5 is a block diagram of conventional odd/even summation circuitry for adding a column of partial products produced by a radix 8 multiplier when multiplying the foregoing two operands.
Figure 8:
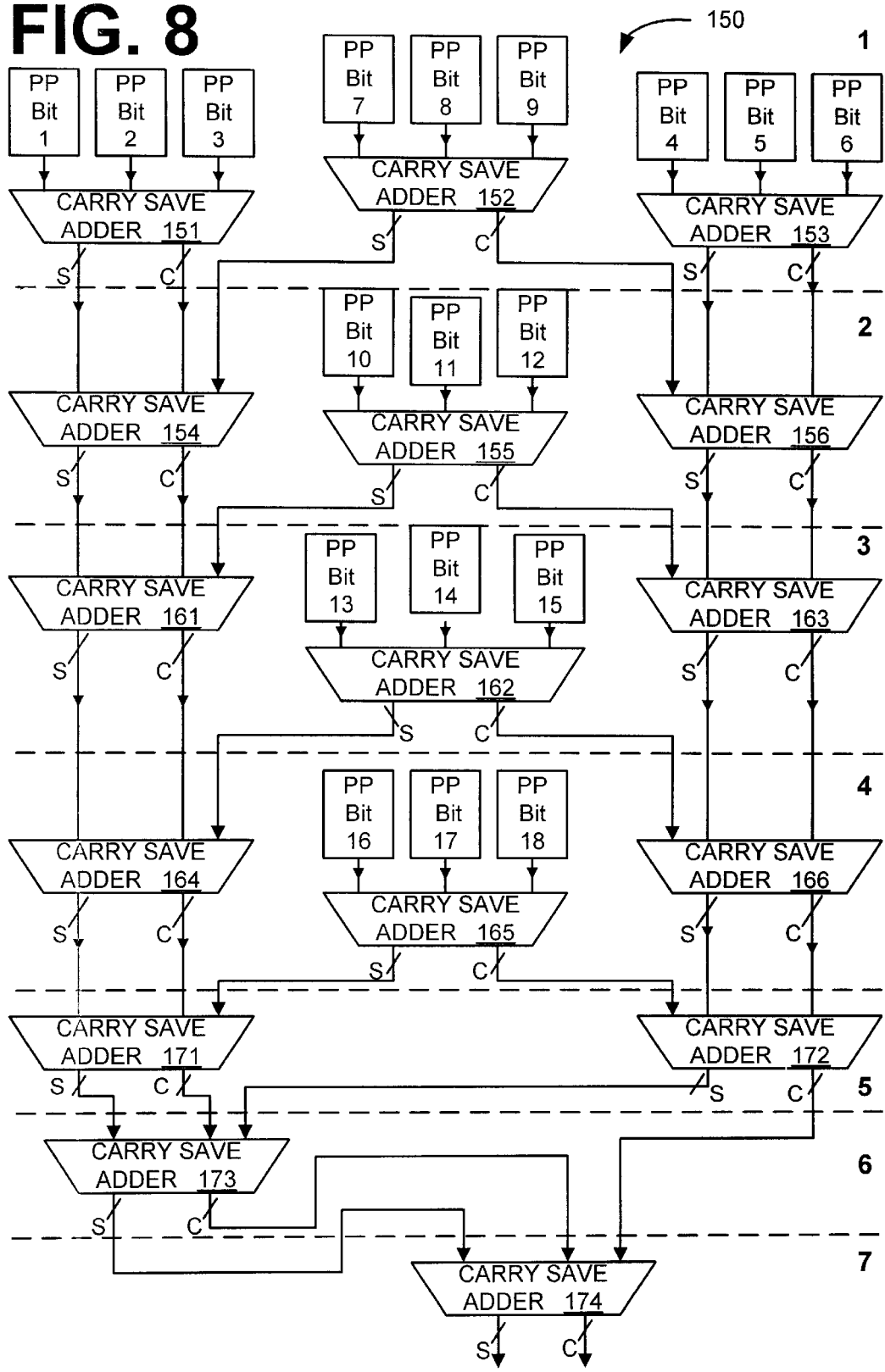
FIG. 8 is block diagram of circuitry that illustrates techniques that may be used to increase the performance of an array of odd/even summation circuitry, such as an array of odd/even circuitry shown by FIGS. 3, 5, and/or 7.

FIG. 8 depicts circuitry 150 illustrating techniques that may be used in certain situations to further increase the parallelism and, therefore, the performance of odd/even summation circuitry, such as the conventional circuitry 70 depicted by FIG. 5 or the circuitry 130 depicted by FIG. 7. In this regard, similar to circuitry 70 and 130, the circuitry 150 includes at least two linear arrays of carry save adders that utilize linear summation techniques to add in parallel. A first array of carry save adders 151, 154, 161, 164, and 171 adds a group of partial product bits, in which the first carry save adder 151 receives three partial product bits and each of the other carry save adders 154, 161, 164, and 171 receives the carry and sum output from one of the previous carry save adders 151, 154, 161, or 164. Each of the carry save adders 154, 161, 164, and 171 may also receive an additional bit of information to add from another carry save adder 152, 155, 162, or 165 that adds a group of partial product bits.

The second array of carry save adders 153, 156, 163, 166, and 172 adds a group of partial product bits, in which the first carry save adder 153 receives three partial product bits and each of the other carry save adders 156, 163, 166, and 172 receives the carry and sum output from one of the previous carry save adders 153, 156, 163, or 166. Each of the foregoing carry save adders 156, 163, 166, and 172 may also receive an additional bit of information to add from one of the aforementioned carry save adders 152, 155, 162, or 165.

As a result, the configuration of the circuitry 150 enables three partial product bits instead of two partial product bits to be effectively input into the later timing sections (i.e., the timing sections other than timing section 1) of an array of odd/even summation circuitry. For example, in circuitry 130 of FIG. 7, two partial product bits (partial product bits 17 and 18) are added to timing section two of the array of odd/even summation circuitry comprising carry save adders 133, 134, 137 and 138. However, in circuitry 150 of FIG. 8, the sum of three partial product bits (partial product bits 4, 8, and 9) are input into timing section two of the array of odd/even summation circuitry comprising carry save adders 151, 153, 154, 156, 161, 163, 164, 166, 171, and 172. Therefore, by adding the sum of partial product bits rather than individual partial products bits into the later timing sections of odd/even summation circuitry, as shown by FIG. 8, it possible to increase the number of partial product bits added together without increasing the number of timing sections of the odd/even summation circuitry.

In fact, by using the summation techniques shown by FIG. 8, it is possible to achieve near radix 8 performance in a radix 4 implementation having simple and regular summation circuitry. In this regard, refer to FIG. 3, which shows odd/even summation circuitry 50 that may be used when a radix 4 multiplier produces 18 partial product bits. As can be seen by referring to FIG. 3, nine timing sections are required to add a column of the partial products. As shown by FIG. 5, the number of timing sections can be reduced to six, if a more complicated radix 8 multiplier is used instead. However, by using the circuitry 150 of FIG. 8, only seven timing sections (i.e., just one more timing section than the radix 8 implementation) are required to add a column of eighteen partial product bits. As a result, near radix 8 performance in a radix 4 multiplier may be achieved without significantly increasing the summation circuitry used to add the partial product bits.

Furthermore, by combining the features of FIG. 8 with the circuitry shown by FIG. 7, it is possible to achieve near Wallace tree performance in a radix 4 implementation having simple and regular summation circuitry. For example, assume that 36 partial products are generated in a radix 4 multiplier. Therefore, as previously described, the partial products may be grouped into an upper portion and a lower portion of 18 partial products each in accordance with the present invention. Then, the circuitry 150 of FIG. 8 may be used to add a column of one of the portions, and other circuitry identical to circuitry 150 of FIG. 8 may be used to separately, and in parallel, add the same column of the other portion. The results of the additions of the upper and lower portions may then be added together to produce the summation of the column of partial product bits. As shown by FIG. 8, only seven timing sections are needed to produce a first summation of the partial product bits from the column in the upper portion and to produce a second summation the partial product bits from the column in the lower section. Therefore, assuming that only two more timing sections are needed to add together the results of the first and second summations, the column of partial product bits can be added within nine timing sections. It should be apparent that such performance rivals that of the Wallace tree implementation, yet the circuitry is simple and regular by utilizing even/odd summation techniques.

Referring to FIG. 8 in more detail, the circuitry 150 may receive up to eighteen partial product bits, although the circuitry 150 may be modified to receive any number of partial product bits. The circuitry 150 is segregated into timing sections, which include logic operations are performed substantially concurrently (e.g., during the same clock cycle). Each of six carry save adders 151, 152, 153, 155, 162 and 165, have three partial product bits input into the carry save adder.

In timing section 1, the three carry save adders 151, 152 and 133, are loaded and fully utilized in parallel. The sum and carry outputs of carry save adder 151 are input into carry save adder 154. The sum and carry outputs of carry save adder 153 are input into carry save adder 156. Furthermore, the sum and carry outputs of carry save adder 152 are respectively input into carry save adders 154 and 156.

In timing section 2, carry save adders 154 and 156 compute sum and carry outputs, which are input into carry save adders 161 and 163, respectively. Carry save adder 155 adds three partial product bits 10–12. The sum output of carry save adder 155 is input into care a save adder 161, and the carry output from carry save adder 155 is input into carry save adder 163.

In timing section 3, carry save adders 161 and 163 compute the sum and carry outputs that are input into carry save adders 164 and 166, respectively. Carry save adder 162 adds three partial product bits 13–15. The sum output of carry save adder 162 is input into carry save adder 164, and the carry output from carry save adder 162 is input into carry save adder 166.

In timing section 4, carry save adders 164 and 166 compute sum and carry outputs, which are input into carry save adders 171 and 172, respectively. Carry save adder 165 adds three partial product bits 16–18. The sum output of carry save adder 165 is input into care a save adder 171, and the carry output from carry save adder 165 is input into carry save adder 172.

In timing section 5, carry save adder 171 computes the sum and carry outputs that are input into carry save adder 173. The sum output from carry save adder 172 is also input into carry save adder 173. The carry output from carry save adder 172 is input into carry save adder 174.

In timing section 6, carry save adder 173 accepts the sum and carry output of carry save adder 171 and sum output of carry save adder 172 as input. Carry save adder 173 then computes sum and carry values for output into carry save adder 174.

In timing section 7, the carry save adder 174 utilizes the sum and carry output from carry save adder 173 and the carry output of carry save adder 172 to compute an overall sum and carry output. The carry save adders 173 and 174 perform the functionality of summing the summing results produced by the first group of carry save adders 151, 154, 161, 164, and 171 and the second group of carry save adders 153, 156, 163, 166, and 172.

The summation techniques shown by FIG. 8 may be particularly useful in implementations where there is an additional partial product bit that would otherwise require an additional timing section. For example, assume that a multiplier produces nineteen partial product bits. If only the summation techniques shown by FIG. 7 were used to add a column of the partial product bits, then an additional timing section would be required. However, by utilizing the techniques shown by FIG. 8, this additional partial product bit can be accommodated without increasing the number of timing sections.

In this regard, instead of inputting partial product bits 9 and 10 into carry save adders 141 and 142, respectively, partial product bits 9 and 10 and the additional partial product bit can be input into another carry save adder (not shown). The carry output and the sum output of this carry save adder (not shown) may then be input into carry save adder 142 and carry save adder 141, respectively. Other than the aforementioned changes, the circuitry 130 is the same as that shown by FIG. 7. As a result, the nineteen partial product bits may be added together within seven timing sections. In other words, the additional partial product bit is accommodated without increasing the number of timing sections. Furthermore, the number of partial product bits accommodated by the circuitry 130 may be further increased without increasing the number of timing sections by summing additional partial products bits with partial product bits 7 and 8 and partial product bits 17 and 18, respectively, in the same way that partial product bits 9 and 10 are summed with an additional partial product bit (not shown).

If desired, the techniques shown by FIG. 8 may also be employed to increase the performance of conventional designs. For example, assume that circuitry 110 of FIG. 5 is used to add a column of thirteen partial product bits. Rather than adding an additional timing section, partial product bits 11 and 12, for example, can be input into a carry save adder (not shown) along with the additional partial product bit. The carry output and the sum output from this carry save adder (not shown) can then be input into carry save adders 118 and 117, respectively, instead of partial product bits 11 and 12. In the same way, additional bits could be summed with partial product bits 9 and 10 and partial product bits 7 and 8, respectively.

In conclusion, increased radix 4 performance may be obtained without a significant increase in circuitry complexity by implementing the techniques shown by FIG. 7. This performance may be further increased by implementing the techniques shown by FIG. 8. As a result, near Wallace tree performance may be achieved in a radix 4 implementation that has relatively simple and regular wiring complexity.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the, invention without departing substantially from the spirit and principles of the invention. All such modifications and variations are intended to be included herein within the scope of the present invention and protected by the following claims.

What is claimed is:

1. Summation circuitry for adding a column of partial product bits produced by a multiplier in multiplying a first operand and a second operand, said circuitry comprising:

first summation circuitry configured to produce a first summation of a first portion of said partial product bits, said first summation defined by a first plurality of bits, said first summation circuitry having first and second linear arrays of adders, said first summation circuitry defining a plurality of adder levels, each of said adder levels defined by said first summation circuitry comprising a different adder from said first linear array and a different adder from said second linear array, wherein a plurality of partial product bits of said first portion are input into said first summation circuitry at different ones of said adder levels defined by said first summation circuitry;

second summation circuitry configured to produce a second summation of a second portion of said partial product bits, said second summation defined by a second plurality of bits, said second summation circuitry having third and fourth linear arrays of adders, said second summation circuitry defining a plurality of adder levels, each of said adder levels defined by said second summation circuitry comprising a different adder from said third linear array and a different adder from said fourth linear array, wherein a plurality of partial product bits of said second portion are input into said second summation circuitry at different ones of said adder levels defined by said second summation circuitry; and a linear array of adders configured to receive and to add said first and second plurality of bits.

2. The circuitry of claim 1, wherein each of said linear array of adders is implemented via carry save adders.

3. The circuitry of claim 1, wherein said first linear array of adders includes a first adder and a second adder, said first adder configured to receive output from said second adder and from a third adder, said third adder configured to receive a plurality of partial product bits from said first portion of said partial product bits.

4. The circuitry of claim 1, wherein each of said adders is a carry save adder.

5. Summation circuitry for adding a column of partial product bits produced by a multiplier in multiplying a first operand and a second operand, said circuitry comprising:

a first plurality of adders, each of said first plurality of adders configured to receive a plurality of said partial product bits and to add said plurality of partial product bits thereby producing a sum bit and a carry bit;

a first linear array of adders configured to receive and add a plurality of said partial product bits thereby producing a first summation of bits, each of a plurality of adders in said first linear array configured to receive a sum bit and a carry bit from another adder of said first linear array and to receive a bit output by one of the adders of said first plurality of adders;

a second linear array of adders configured to receive and add a plurality of said partial product bits thereby producing a second summation of bits, each of a plurality of adders in said second linear array configured to receive a sum bit and a carry bit from another adder of said second linear array and to receive a bit output by one of the adders of said first plurality of adders; and at least one adder configured to add said first and second summations.

6. The circuitry of claim 5, wherein each of said adders is a carry save adder that outputs a single carry bit and a single sum bit.

7. The circuitry of claim 5, wherein said at least one adder is configured to produce a third summation of bits based on said first and second summations, and wherein said system further comprises:

a third linear array of adders configured to receive and add a plurality of said partial product bits thereby producing a fourth summation of bits, each of a plurality of adders in said third linear array configured to receive a sum bit and a carry bit from another adder of said third linear array and to receive a bit output by one of the adders of said first plurality of adders;

a fourth linear array of adders configured to receive and add a plurality of said partial product bits thereby producing a fifth summation of bits, each of a plurality of adders in said fourth linear array configured to receive a sum bit and a carry bit from another adder of said fourth linear array and to receive a bit output by one of the adders of said first plurality of adders;

at least one adder configured to add said fourth and fifth summations thereby producing a sixth summation of bits; and at least one adder configured to add said third and sixth summation of bits.

8. A method for adding a column of partial product bits produced by a multiplier in multiplying a first operand and a second operand, comprising the steps of:

providing first summation circuitry, said first summation circuitry having first and second linear arrays of adders;

inputting a first portion of said partial product bits into each of a plurality of adders in said first linear array and into each of a plurality of adders in said second linear array;

providing second summation circuitry, said second summation circuitry having third and fourth linear arrays of adders;

inputting a second portion of said partial product bits into each of a plurality of adders in said third linear array and into each of a plurality of adders in said fourth linear array;

producing, via said first summation circuitry, a first summation of said first portion of said partial product bits, said first summation defined by a first plurality of bits;

producing, via said second summation circuitry, a second summation of said second portion of said partial product bits, said second summation defined by a second plurality of bits;

adding together said first summation and said second summation; and producing a third plurality of bits via said adding step, said third plurality of bits forming a carry save representation of a product bit.

9. The method of claim 8, wherein each of said adders is a carry save adder.

10. The method of claim 8, wherein said first and second linear arrays are in parallel with each other, wherein said third and fourth linear arrays are in parallel with each other, and wherein said first summation circuitry and said second summation circuitry are in parallel with each other.

11. A method for use in a multiplier, said multiplier for producing a plurality of partial product bits based on a first operand and a second operand multiplied together by said multiplier to produce a product, comprising the steps of:

providing first summation circuitry, said first summation circuitry having first and second linear arrays of adders, said first summation circuitry defining a plurality of adder levels, each of said adder levels defined by said first summation circuitry comprising a different adder from said first linear array and a different adder from said second linear array;

inputting a plurality of said partial product bits into said first summation circuitry at different ones of said adder levels defined by said first summation circuitry;

adding, via said first summation circuitry, a first portion of said partial product bits to produce a first summation of partial product bits, said first portion including each of said partial product bits input into said first summation circuitry;

providing second summation circuitry, said second summation circuitry having third and fourth linear arrays of adders, said second summation circuitry defining a plurality of adder levels, each of said adder levels defined by said second summation circuitry comprising a different adder from said third linear array and a different adder from said fourth linear array;

inputting a plurality of said partial product bits into said second summation circuitry at different ones of said adder levels defined by said second summation circuitry;

adding, via said second summation circuitry, a second portion of said partial product bits to produce a second summation of partial product bits, said second portion including each of said partial product bits input into said second summation circuitry;

adding said first and second summations thereby forming a carry save representation of a product bit of said product.

12. The method of claim 11, wherein each of said adders is a carry save adder.

13. The method of claim 11, further comprising the steps of:

adding one of said partial product bits to another of said partial product bits to produce a first output bit and a second output bit;

transmitting said first output bit to an adder in said first linear array; and transmitting said second output bit to an adder in said second linear array.

14. The method of claim 13, wherein each of said adders is a carry save adder that outputs a single carry bit and a single sum bit.

15. A method for adding a column of partial product bits produced by a multiplier in multiplying a first operand and a second operand, comprising the steps of:

providing a first plurality of adders;

providing a first linear array of adders;

providing a second linear array of adders;

for each of said first plurality of adders, adding a plurality of said partial product bits and outputting sum and carry bits;

transmitting, to each of a plurality of adders in said first linear array of adders, a sum bit and a carry bit from another adder of said first array of adders;

transmitting, to each of said plurality of adders in said first linear array of adders, a bit output by one of said first plurality of adders;

transmitting, to each of a plurality of adders in said second linear array of adders, a sum bit and a carry bit from another adder of said second array of adders;

transmitting, to each of said plurality of adders in said second linear array of adders, a bit output by one of said first plurality of adders;

adding, via said first linear array of adders, a plurality of said partial product bits thereby producing a first summation of partial product bits;

adding, via said second linear array of adders, a plurality of said partial product bits thereby producing a second summation of partial product bits; and adding said first and second summations thereby producing a carry save representation of a product bit of a product produced by said multiplier in multiplying said first and second operands.

16. The method of claim 15, wherein each of said adders is a carry save adder.

17. Circuitry for adding a column of partial product bits produced by a multiplier, comprising:

first summation circuitry configured to produce a first summation of a first portion of said partial product bits, said first summation circuitry comprising first and second linear arrays of adders configured to add said first portion in parallel, wherein partial product bits of said first portion are input into said first and second arrays at different timing sections within said first and second arrays;

second summation circuitry configured to produce a second summation of a second portion of said partial product bits, said second summation circuitry comprising third and fourth linear arrays of adders configured to add said second portion in parallel, wherein partial product bits of said second portion are input into said third and fourth arrays at different timing sections within said third and fourth arrays; and a fifth linear array of adders configured to add together said first and second summations, wherein said first and second summation circuitry are configured to add said first and second portions in parallel.

18. The circuitry of claim 17, wherein each of said adders is a carry save adder.

19. The circuitry of claim 17, wherein said fifth linear array of adders is configured to produce a carry save representation of a product bit for a product that is produced by said multiplier in multiplying a first operand and a second operand.

* * * * *